United States Patent [19]

Warlick et al.

[11] 4,354,946

[45] Oct. 19, 1982

[54] OIL RECONDITIONING APPARATUS AND METHOD

[75] Inventors: Frank M. Warlick, 7126 Hopeton Rd., Charlotte, N.C. 28210; Carl J. Eloff, Catawba, S.C.

[73] Assignee: Frank M. Warlick, Charlotte, N.C.

[21] Appl. No.: 285,849

[22] Filed: Jul. 22, 1981

[51] Int. Cl.³ ................... B01D 35/18; B01D 3/28
[52] U.S. Cl. ................... 210/774; 210/790; 210/168; 210/180; 210/184; 210/238; 210/436; 210/434; 123/196 A; 196/46.1
[58] Field of Search ............ 210/774, 775, 790, 168, 210/180, 181, 184, 232, 238, 433.1, 434, 436, 428; 123/196 A; 196/46.1, 128

[56] References Cited

U.S. PATENT DOCUMENTS

| | | | |
|---|---|---|---|
| 1,987,847 | 1/1935 | Flood | 210/434 |
| 2,407,190 | 9/1946 | Tait | 210/434 |
| 2,713,422 | 7/1955 | James | 210/184 |
| 3,616,885 | 11/1971 | Priest | 210/180 |
| 3,915,860 | 10/1975 | Priest | 210/180 |
| 4,146,475 | 3/1979 | Forsland | 210/184 |
| 4,227,969 | 10/1980 | Engel | 210/180 |

FOREIGN PATENT DOCUMENTS 594856  11/1947  United Kingdom ............ 210/434

Primary Examiner—Ernest G. Therkorn
Attorney, Agent, or Firm—Bell, Seltzer, Park & Gibson

[57] ABSTRACT

An oil reconditioner for use with an internal combustion engine is provided for returning the reconditioned oil to the engine under pressure. The oil reconditioner has an oil filter chamber into which a first portion of a pressurized stream of oil from the high pressure side of the engine is directed so that the oil may flow through the filter chamber and into a heated vaporization chamber thereabove for vaporizing any liquid contaminants within the filtered oil to thereby recondition the oil. The reconditioned oil from the vaporization chamber is directed into and joined with the pressurized unreconditioned portion of the stream of oil that has bypassed the oil filter and vaporization chambers so that the reconditioned oil will return to the engine under pressure along with the pressurized unreconditioned portion of the stream of oil.

13 Claims, 10 Drawing Figures

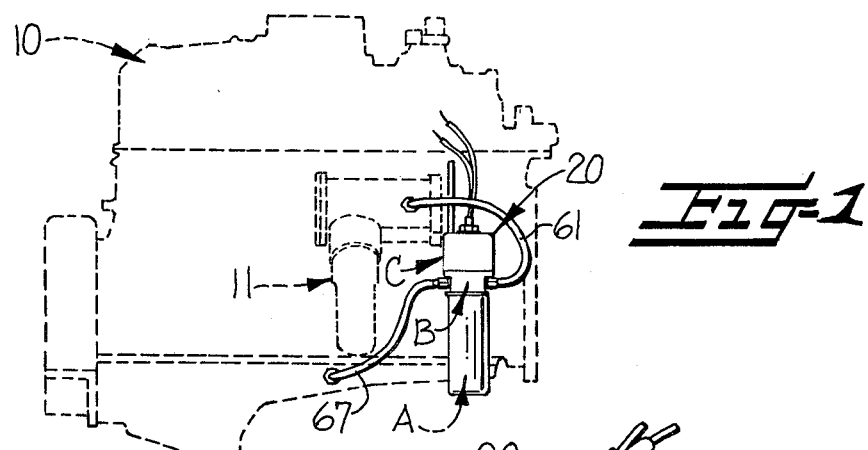
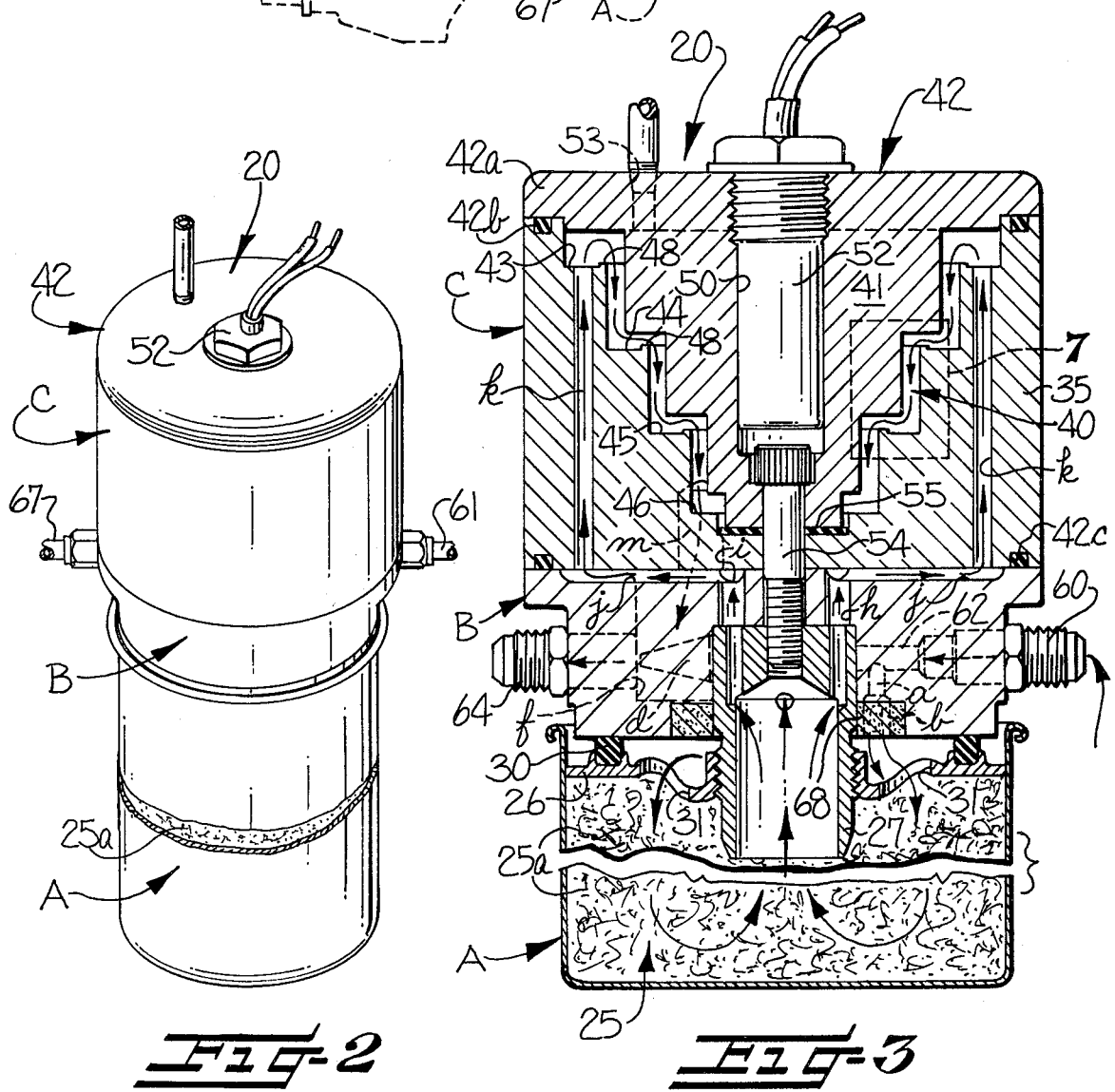

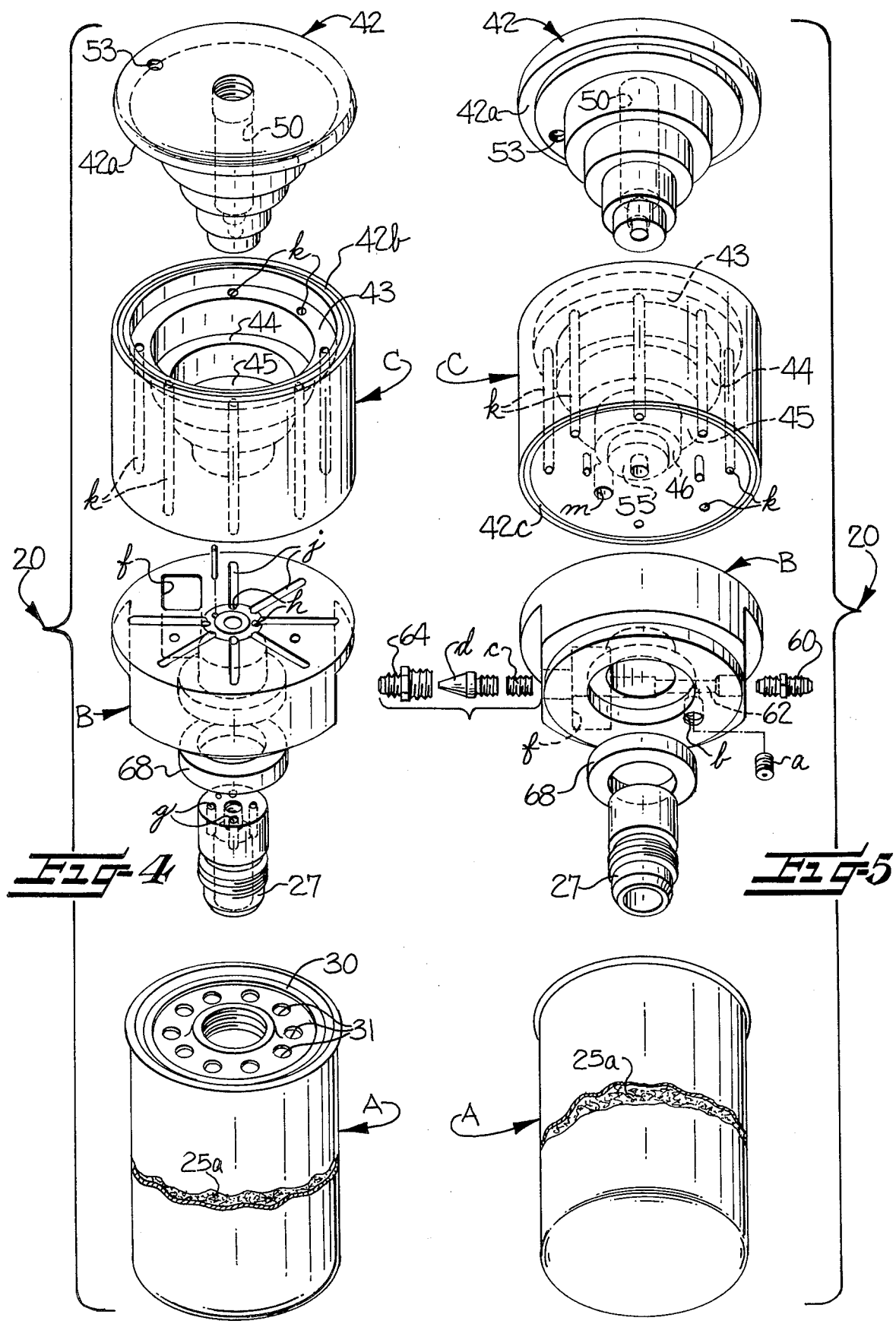

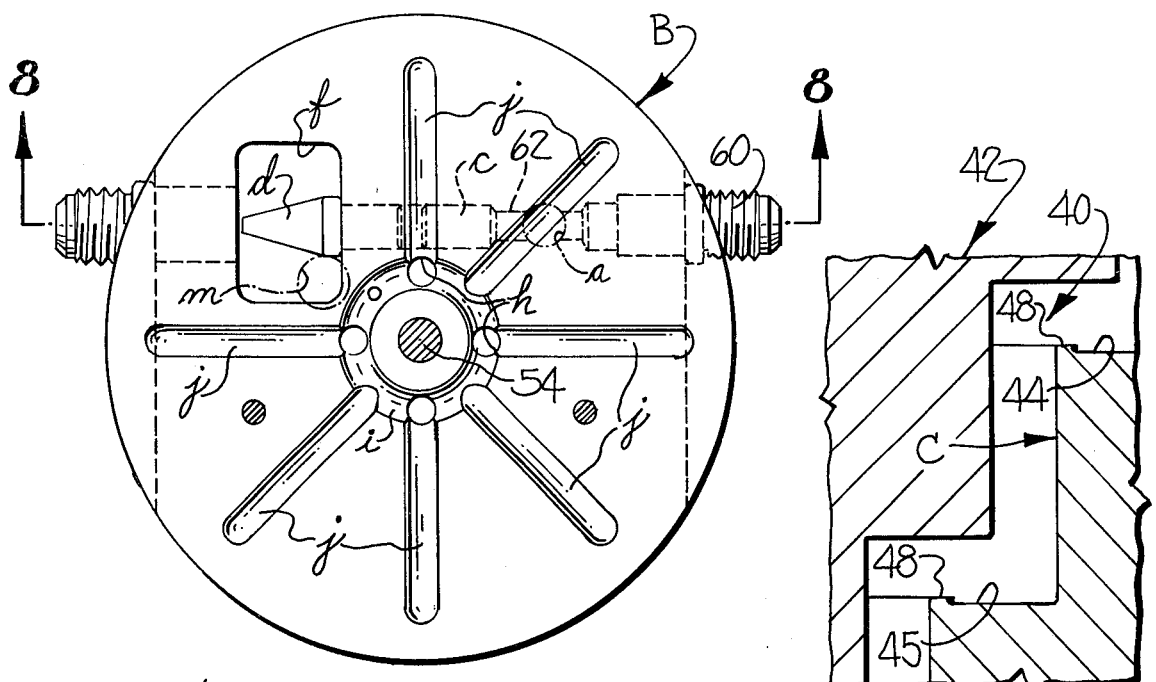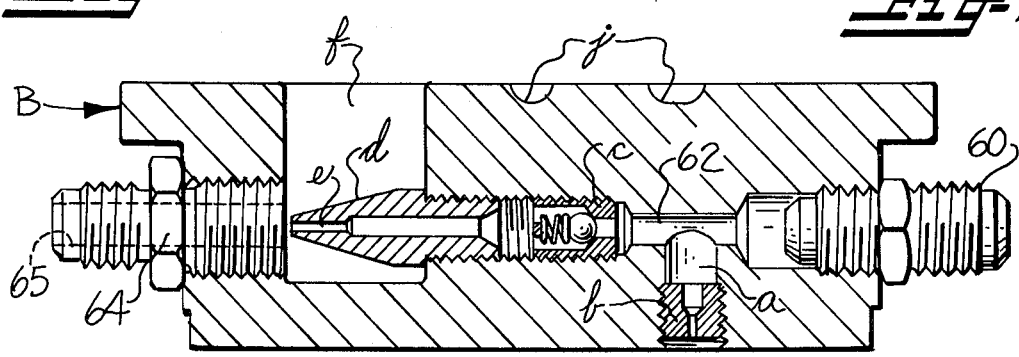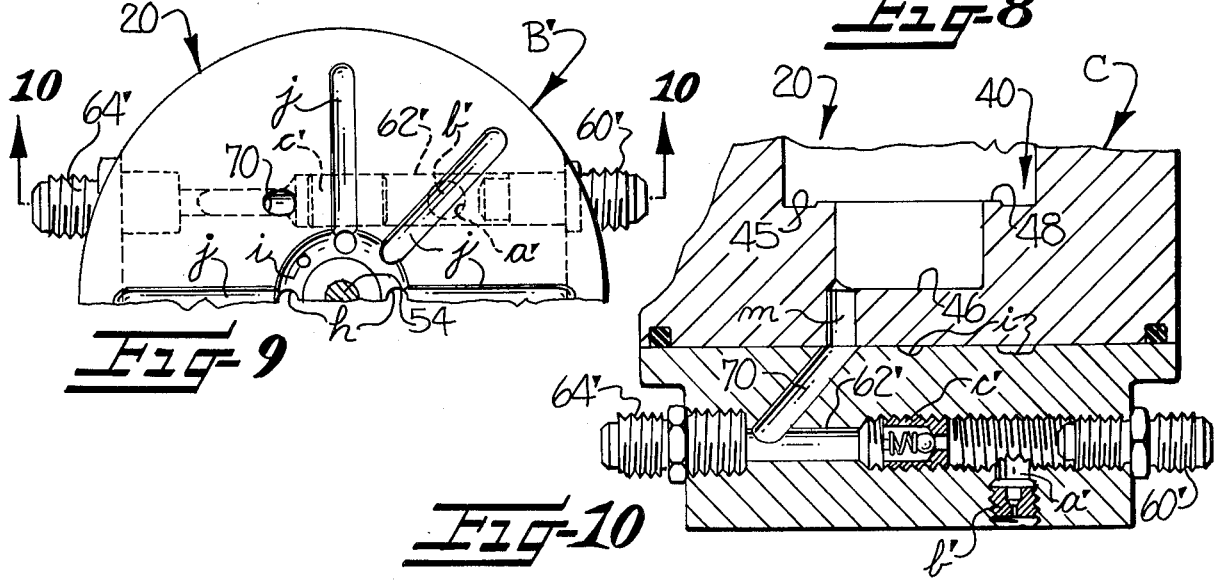

OIL RECONDITIONING APPARATUS AND METHOD

This invention relates to the art of reconditioning lubricating oil, and more especially, to an apparatus and method for use with an internal combustion engine for removing both solid and liquid contaminants from the lubricating oil of the engine.

Various forms of oil reconditioning apparatuses and methods have been proposed heretofore for use with internal combustion engines, and which have a mechanical oil filter for removing solid contaminants from the oil and a vaporization chamber for removing liquid contaminants, such as fuel and water, from the oil by vaporization. Oil reconditioning apparatuses of this type are disclosed, for example, in U.S. Pat. Nos. 3,616,885; 3,915,860; and 4,227,969, wherein the oil to be reconditioned is directed into the mechanical or particle filter of the reconditioning apparatus from the pressure side of the engine's oil circulating system so that the oil is pumped into and through the mechanical filter and then flows upwardly into the vaporization chamber where the oil is heated to vaporize the liquid contaminants from the oil. The vapor is directed outwardly into the ambient air or into a vapor discharge line, as the thus reconditioned oil flows, by gravity, from the vaporization chamber back to the engine oil pan.

In all prior art, it has been necessary to return the reconditioned oil from the vaporization chamber to the engine by gravity. This has seriously limited commercialization of all oil reconditioners and has presented difficult and sometimes insurmountable problems in the installation of oil reconditioners on an engine because of space limitations and because of the need to have the oil reconditioner mounted at a sufficiently high level to ensure the required gravity flow of the reconditioned oil therefrom to the engine.

With the foregoing in mind, it is an object of this invention to provide an improved oil reconditioning apparatus which is so constucted and arranged that the reconditioned oil, upon successively passing through the mechanical filter and the vaporization chamber of the apparatus, is caused to flow back to the engine under pressure, thus permitting the positioning of the oil reconditioning apparatus at any convenient location on or near the engine without being hampered by the need for gravity flow of oil from the apparatus back to the engine.

According to the invention, the oil reconditioning apparatus comprises a housing provided with a filter chamber containing a filter medium therein, with an oil inlet leading into the filter chamber and adapted to be connected to the high pressure side of the engine's oil circulating system so as to deliver a stream of pressurized oil to the apparatus. The housing also has a vaporization chamber therein above the filter chamber and having an inlet side communicating with the filter chamber so as to receive filtered oil therethrough from the filter chamber and to vaporize any liquid contaminants within the filtered oil. Means are provided for directing a first portion of the stream of pressurized oil from the engine into the oil filter chamber so that the oil may flow through the oil filter chamber and into the vaporization chamber thereabove, and for concurrently directing the remaining portion of the stream of pressurized oil in bypassing relation to the oil filter chamber and the vaporization chamber, and for directing reconditioned oil from the vaporization chamber into the pressurized unreconditioned portion of the stream of oil that has bypassed the oil filter and vaporization chambers and back to the low pressure side of the engine so that the reconditioned oil will return to the engine under pressure along with the pressurized unreconditioned portion of the stream of oil.

Some of the features of the invention having been stated, others will appear as the description proceeds when taken in connection with the accompanying drawings, in which FIG. 1 is a view of a preferred form of the improved oil reconditioning apparatus of the present invention, showing the same, in solid lines, in association with an internal combustion engine which is shown in phantom lines;

FIG. 2 is an enlarged perspective view of the oil reconditioning apparatus of FIG. 1;

FIG. 3 is an enlarged longitudinal or vertical sectional view taken substantially along the longitudinal or vertical axis of the improved oil reconditioning apparatus as viewed in FIGS. 1 and 2;

FIG. 4 is a partially exploded perspective view looking inwardly and downwardly at the top of various components of the apparatus;

FIG. 5 is a view similar to FIG. 4, but looking upwardly and inwardly at the various components of the apparatus;

FIG. 6 is a plan view of an intermediate section or manifold of the oil reconditioning apparatus;

FIG. 7 is an enlarged fragmentary sectional view of the portion of the vaporization chamber identified by the numeral 7 in FIG. 3;

FIG. 8 is a vertical sectional view through the manifold and taken substantially along line 8—8 in FIG. 6;

FIG. 9 is a fragmentary plan view of one half of a manifold such as is shown in FIG. 6, but illustrating a modification of the invention; and FIG. 10 is a fragmentary vertical sectional view taken substantially along line 10—10 in FIG. 9, and showing a portion of the upper section of the housing in association with the manifold.

While this invention will be described hereinafter with particular reference to the accompanying drawings, in which illustrative embodiments of the invention are set forth, it is to be understood at the outset of the description which follows that it is contemplated that persons skilled in the applicable arts may modify the specific details to be described while continuing to use this invention. Accordingly, the description is to be understood as a broad teaching of this invention, directed to persons skilled in the applicable arts.

Referring more specifically to the drawings, the first embodiment of the improved oil reconditioning apparatus of this invention is shown in FIG. 1 in association with an internal combustion engine 10 normally equipped with a conventional oil filter 11 through which all the lubricating oil pumped through the engine 10 normally flows and is circulated under pressure before the oil is again pumped and recycled through the engine, as is usual. The reconditioning apparatus embodying the features of this invention comprises a composite housing broadly designated at 20 and including three substantially axially aligned sections, namely, a lower section A serving as an oil filter unit or canister, an intermediate section B serving as a manifold, and an upper section C serving as a vaporizer.

The canister A may be of a well known type constituting part of what is generally termed as a "spin-off" mechanical or particle filter having a filter chamber 25 therein and being threadedly connected to the lower portion of the manifold B. Stated otherwise, the filter section A of housing 20 comprises a disposable throw-away filter canister threadedly connected to another section of the housing 20 for ready replacement thereof. Accordingly, the filter chamber 25 of canister A contains a suitable filter 25a therein (FIG. 3) formed of a suitable fibrous or paper filter medium. Filter 25a is retained in the canister A by a filter end wall or filter retaining plate 26 having an internally threaded central portion threaded onto a hollow adapter 27 projecting axially downwardly from the lower surface of the manifold B. An annular resilient seal 30 is provided between wall 26 and the lower surface of manifold B to prevent leakage of oil in its course from manifold B into filter chamber 25 via a plurality of openings 31 in the top end wall 26 of canister A.

The oil reconditioning apparatus may be mounted on the engine 10 by any suitable means. For example, either or both sections B, C of the housing 20 may be provided with suitable bracket means, not shown, with bolts or screws extending therethrough for securing the oil reconditioning apparatus in the desired position on or adjacent the engine 10, such as that illustrated in FIG. 1.

Referring now to the vaporizer or upper section C of housing 20, in the illustrated embodiment shown in FIGS. 3, 4 and 5, it will be observed that the vaporizer may be in the form of a generally cylindrical body 35 of about the same external diameter as the manifold B against which the lower end of the vaporizer is positioned.

The vaporizer C is provided with a vaporization chamber 40 therein in the form of a stepped or tiered generally frusto-conical cavity in the upper end of vaporizer C and which loosely receives therein a generally mating, tiered, substantially frusto-conical body 41 of a vaporization chamber closure member or cap 42. As shown, the vaporization chamber 40 is defined by a plurality of annular steps or tiers (four in this instance) forming inner and upper surfaces of the body 35 of vaporizer C. Each of the tiers comprises an annular substantially flat cylindrical surface arranged at graduated elevations from the outer end of the vaporizer C downwardly to the lower central portion of the vaporizer body 35.

The tiers of the vaporizer C include a top tier 43, intermediate tiers 44, 45, and a bottom tier 46 of a progressively decreasing diameter, the upper or step surfaces of each tier being substantially flat and being provided with an inner peripheral projecting ridge or shoulder 48 thereon, thus allowing oil and liquid contaminants to spread in a thin film on the flat upper surface of each tier or step 43–46. The uppermost or top tier 43 is provided with a plurality of circularly arranged vertically extending passageways or capillaries k therein which extend downwardly to the bottom surface of the vaporizer C for receiving oil, through passageways to be later described, from the filter chamber 25. Thus, the open upper ends of the passageways k and the upper surface of the top tier 43 define the oil inlet side of the vaporization chamber 40.

The vaporizer body 35, the vaporization chamber 40, and the cap 42 are heated to a desired temperature for vaporizing the liquid contaminants in chamber 40 by means of a suitable electrical resistance heater 52 threadedly secured in a relatively large threaded cavity or bore 50 provided in the outer or upper end portion of the cap 42. Thus, as the filtered oil flows into the inlet side of the vaporization chamber 40, it accumulates on the tiers 43–46 and cascades downwardly in the vaporization chamber 40 as the heat in the chamber 40 vaporizes the more volatile liquid contaminants in the oil and causes them to be discharged from the vaporization chamber 40 through the passageway 53 in the uppermost wall portion of the cap 42. An upper flange portion 42a on the cap 42 overlies the upper end peripheral portion of the body 35 of vaporizer C and also engages an annular resilient seal 42b embedded in the upper end of the body 35 of vaporizer C. A similar seal 42c is provided in the lower or inner end of the body 35 of vaporizer C for sealingly engaging the upper surface of the manifold B adjacent the outer periphery thereof.

The body 35 of vaporizer C is secured to the intermediate section or manifold B by means of a centrally positioned screw 54 which also serves to secure an upper or inner portion of the hollow adapter 27 in a corresponding cavity provided therefor in the lower surface of the manifold B. More particularly, it will be observed in the central portion of FIG. 3 that the screw 54 extends through the central proximal lower portions of the housing cap 42 and the body 35 of vaporizer C, and the screw 54 also extends through the central upper portion of the manifold B, with the lower end portion of the screw 54 being threaded into the proximal end portion of the adapter 27. Since the filter end wall 26 is threaded onto the lower portion of the adapter 27, it can thus be seen that the lower, intermediate and upper sections A, B, C of the housing 20, and the cap 42, are secured together in a unitary manner by means of the screw 54.

A suitable gasket 55 may be provided between the proximal surfaces of the lower or inner end of the cap 42 and the bottom of the substantially frusto-conical cavity defining the vaporization chamber 40 in the vaporizer body 35.

As indicated earlier herein, in accordance with the present invention, means are provided for directing a first portion of the stream of pressurized oil from the pressure side of the engine 10 into the oil filter chamber 25 and for concurrently directing the remaining portion of the stream of pressurized oil in bypassing relation to the oil filter chamber and the vaporization chamber 40, and for directing reconditioned oil from the vaporization chamber 40 into the pressurized unreconditioned portion of the stream of oil that has bypassed the oil filter and vaporization chambers so that the reconditioned oil will return to the engine under pressure along with the pressurized unreconditioned portion of the stream of oil. Accordingly, it will be observed in FIGS. 3, 5, 6 and 8 that the intermediate section or manifold B of housing 20 has an oil inlet 60 (shown in the form of a threaded pipe coupling) which is communicatively connected to the positive pressure side of the oil circulating system of the engine 10 by means of a conduit or pipe 61 (FIG. 1). The oil inlet 60 is aligned with and connected to a substantially horizontal passageway 62 in the manifold B and which may extend generally parallel with the substantially flat upper and lower surfaces of manifold B.

A first portion of the stream of pressurized oil being diverted and directed from the engine 10 into the passageway 62 is directed into the oil filter chamber 25 by way of a branch passageway a (FIG. 8) formed in the lower surface of the manifold B and extending upwardly to the horizontal passageway 62. A restriction valve member or restrictor b of predetermined size is provided in the passageway a for permitting oil to flow, at a substantially less pressure than that of the oil entering the passageway 62, into the filter chamber 25 via the openings 31 in the end wall 26 of the filter chamber 25.

Downstream of the passageway a, the passageway 62 in the manifold B has a spring-loaded ball check valve c therein which is also restricted and thus serves as a pressure control valve or restrictor for the pressurized fluid flowing along the passageway 62 to and through a nozzle d having a further restricted discharge opening e in the free end thereof. The free end of the nozzle d is positioned within an oil collecting chamber or sump area f (FIGS. 6 and 8) formed in the manifold B and being open at its upper end, but closed at its bottom, for purposes to be later described. The free end of the nozzle d terminates closely adjacent the inner end of an oil outlet 64, shown in the form of a threaded pipe coupling and having a longitudinal passageway 65 therein. Oil outlet 64 is adapted to be connected to the low pressure side or oil pan of the internal combustion engine 10 as by means of a conduit 67 (FIG. 1). The free end of the nozzle d and the oil outlet 64 cooperate to form a venturi or aspirator means, the function of which will be later described.

As heretofore stated, the passageway a and restrictor b are provided for permitting the flow of pressurized oil from the passageway 62 into the filter chamber 25, and it is apparent that the filter medium 25a in the filter chamber is provided for removing solid contaminants or particles from the pressurized oil. To aid in removing fine solid contaminants from the unreconditioned oil entering the oil filter unit A, magnetic means may be provided in or adjacent the lower surface of manifold B and within the area defined by the annular resilient seal 30 for attracting fine metallic contaminants thereto from the oil flowing from the passageway a into the filter. Accordingly, an annular permanent magnet 68 is shown in FIGS. 3–5 which may be pressed into or otherwise secured in a suitable recess provided therefor in the bottom of manifold B and positioned in encircling relation to the adapter 27. As preferred, the magnet 68 is illustrated substantially flush with the lower surface of manifold B and is so positioned that it may be readily wiped clean by an operative whenever the filter unit A is removed from the adapter 27 and manifold B.

In order to direct the filtered oil upwardly from the filter chamber 25 into the vaporization chamber 40, it will be observed in FIGS. 3 and 4 that the upper portion of the adapter 27, into which the screw 54 is threaded, is provided with a plurality of circularly arranged passageways g therethrough aligned with respective passageways h formed in the manifold B and leading to the upper surface of the manifold B for communication with an annular passageway-defining groove i formed in the upper surface of the manifold B and extending around and in closely spaced relation to the screw 54. A plurality of generally radially extending passageway-defining grooves j are provided in the upper surface of manifold B and extend outwardly from the groove i, as best shown in FIGS. 4 and 6, so as to be in alignment with and communicate with the lower ends of the circularly arranged capillaries or relatively small vertical passageways k whose upper ends terminate at the uppermost of the tiers 43 defining the vaporization chamber 40, as heretofore described.

Thus, it can be seen that a portion of the lubricating oil is diverted and directed from the pressure side of the oil circulating system of the engine 10, through the oil inlet or fitting 60, so as to deliver a stream of pressurized oil to the oil reconditioning apparatus, and that the passageways 62, a and the restrictor b direct a first portion of the stream of pressurized oil from the engine 10 into the oil filter chamber 25, concurrently with which the pressure control valve c, nozzle d and outlet fitting 64 direct the remaining portion of the stream of pressurized oil in bypassing relation to the oil filter chamber 25 and the vaporization chamber 40. It should be noted that the restrictors b, c preferably are sized so that oil enters the filter chamber 25, via restrictor b and openings 31, under relatively low pressure and at a relative low rate as compared to the relatively higher pressure and rate of the oil entering nozzle d from the passageway 62 via the pressure control valve or restrictor c.

About ten percent of the pressurized lubricating oil pumped through the engine 10 is typically diverted from the engine's oil circulating system into the housing oil inlet 60 as a stream of pressurized oil, with only a minor portion of the diverted stream of pressurized oil being directed into the oil filter chamber 25 via the restrictor b so that the minor portion of the stream of oil may flow through filter chamber 25 and into the vaporization chamber 40 thereabove. The remaining major portion of the stream of pressurized oil, which bypasses the oil filter and vaporization chambers 25, 40, is a manyfold greater portion than the aforementioned minor portion of the stream of pressurized oil. As an example, it has also been determined that favorable results are achieved wherein the rate of flow of the major, bypassing, portion of the stream of pressurized oil is about fifty times greater than that rate of flow of the aforementioned minor portion of the stream of oil through the oil filter and vaporization chambers.

Typically, the pressure control valve c may be sized so as to allow an oil stream to flow to the nozzle d at a pressure of about 40 pounds per square inch, and the restrictor b may be sized so as to allow an oil stream to flow therethrough at a pressure of about 20 pounds per square inch while permitting up to about six gallons of oil to flow per hour into and through the oil filter unit A, for example. These pressures and the rate of flow of the oil streams may vary substantially, however, depending upon the size of the engine 10 and the oil pressure generated by the oil pump of the engine. Also, if desired, an oil pressure regulator, not shown, may be positioned in the conduit 61 between the pressure side of the engine's oil circulating system and the oil inlet 60 of the present oil reconditioning apparatus for adjustably controlling the pressure of the oil stream entering the oil inlet 60.

As the oil is being directed into the filter chamber 25, it is apparent that it is mechanically filtered and the filtered oil flows upwardly through the passageways g–k (FIGS. 3–6) to the upper tier 43 of the vaporizer C and thus into the heated vaporization chamber 40. As the oil accumulates in the vaporization chamber, the flat upper surfaces of the tiers 43–46 (FIGS. 3, 4, 5 and 7) allow the oil and liquid contaminants therein to spread in a thin film as the oil spills over the annular shoulders or ridges 48 and thus cascades downwardly to the lowermost portion of the vaporization chamber 40. Thus, the volatile contaminants are vaporized and separated from the oil in the vaporization chamber 40 to thus be exhausted from the vaporization chamber 40 through the vent 53 (FIGS. 4 and 5).

As the now reconditioned oil flows onto the lower tier 46, it then gravitates from the lower portion of the vaporization chamber 40 through an exit port or opening m (FIGS. 1 and 6) in the upper section or vaporizer C and thus into the collection chamber or sump f in the intermediate section or manifold B of the housing 20. Thus, the port m serves as the outlet side of the vaporization chamber 40.

In accordance with the method of this invention, the reconditioned oil is thus directed from the vaporization chamber 40, via port m, into sump f where the aspiration or suction effect produced by the oil flow from nozzle d into oil outlet or fitting 64 causes the reconditioned oil from the vaporization chamber 40 to be drawn into and joined with the pressurized unreconditioned portion of the stream of oil that has bypassed the oil filter chamber 25 and the vaporization chamber 40 so that the reconditioned oil is returned to the engine 10 under pressure by and along with the pressurized unreconditioned portion of the stream of oil.

It can be appreciated that the oil in the vaporization chamber 40 is not under any significant pressure because the vaporization chamber is vented through passageway 53, and the oil is distributed over a relatively large area in the vaporization chamber as compared to the cross-sectional area of the passageways 62 and a, for example. Thus, the suction effect produced by the flow of oil from nozzle d into the oil outlet 64 normally will not affect the flow of oil by gravity within the vaporization chamber 40.

MODIFIED FORM OF THE INVENTION

Referring now to FIGS. 9 and 10, there will be observed a modification of aspirator means which may be used in place of the nozzle d and the oil outlet or pipe fitting 64 of FIGS. 3, 5, 6 and 8, it being noted that the views of FIGS. 9 and 10 are somewhat similar to the respective views of FIGS. 6 and 8. Where applicable, the same reference characters shall apply to the parts shown in FIGS. 9 and 10 as are applied to similar parts in FIGS. 6 and 8. In FIGS. 9 and 10, it will be observed that the intermediate section or manifold B' of the housing 20 is devoid of any oil collecting chamber or sump such as is provided at f in FIGS. 6 and 8 so that the passageway 62' of FIGS. 9 and 10 extends through the manifold B from one side to the other thereof, and threaded tubular fittings 60', 64' are provided and serve as the oil inlet and oil outlet, respectively, at the opposing ends of the passageway 62'. A medial portion of the passageway 62' has a pressure control valve or restrictor c' therein comparable to the pressure control valve c of FIG. 8, and which is positioned downstream of the passageway a' and its restrictor b' in FIG. 10.

In FIG. 10, the means for directing reconditioned oil from the vaporization chamber 40 (FIGS. 3 and 7) into that directing means defined by the passageway 62' in FIG. 10, is shown in the form of an inclined passageway 70 formed in manifold B and having its upper end communicating with the port m extending from the vaporization chamber 40. The lower end of the passageway 70 in FIG. 10 connects with the passageway 62' at a point downstream of the pressure control valve c' and at an acute angle with respect to the direction of flow of the stream of pressurized oil along the passageway 62'.

Thus, the latter stream of pressurized oil produces suction in the inclined passageway 70 so that, as the reconditioned oil from the vaporization chamber 40 gravitates along the port m of FIG. 10 and the inclined passageway 70, the reconditioned oil is drawn into the pressurized unreconditioned stream of oil flowing along the passageway 62' and through the oil outlet 64' and the conduit 67 to the low pressure side or oil pan of the engine 10 (FIG. 1). In other respects, the embodiment of FIGS. 9 and 10 may be substantially the same as the embodiment of FIGS. 1-8, and therefore, a further description thereof is deemed unnecessary.

From the foregoing description, it can be seen that the aspirator means of FIGS. 9 and 10 functions in substantially the same manner as the aspirator means of FIGS. 6 and 8 to cause the reconditioned oil from the vaporization chamber 40 to return to the low pressure side of the engine's oil circulating system under pressure along with the pressurized unreconditioned stream of oil that has bypassed the oil filter chamber 25 and the vaporization chamber 40.

In the drawings and specification there have been set forth preferred embodiments of the invention, and although specific terms are employed they are used in a generic and descriptive sense only, and not for purposes of limitation, the scope of the invention being defined in the claims.

That which is claimed is:

1. In an oil reconditioning apparatus for use with an internal combustion engine having a conventional oil filter through which all the oil pumped through the engine flows before the oil is again pumped and recycled through the engine, said reconditioning apparatus having a housing provided with an oil inlet and an oil outlet, said oil inlet being adapted to be connected to the high pressure side of the engine's oil circulating system so as to deliver a stream of pressurized oil to the apparatus, said housing also having a filter chamber containing a filter medium therein, and a vaporization chamber positioned above the filter chamber and having an inlet side communicating with the filter chamber so as to receive filtered oil therethrough from the filter chamber and to vaporize any liquid contaminants within the filtered oil so as to thereby recondition the oil, said vaporization chamber also having an outlet side through which the reconditioned oil gravitates from the vaporization chamber, the combination therewith of oil flow control means for (a) directing a first portion of the stream of pressurized oil from the engine into said oil filter chamber so that the oil may flow therethrough and into said vaporization chamber thereabove, and for (b) concurrently directing the remaining portion of the stream of pressurized oil in bypassing relation to said oil filter chamber and said vaporization chamber and out of said oil outlet and back into the engine, and for (c) directing reconditioned oil from the vaporization chamber into the pressurized unreconditioned portion of the stream of oil that has bypassed the oil filter and vaporization chambers so the reconditioned oil will return to the engine under pressure along with the pressurized unreconditioned portion of the stream of oil.

2. In an oil reconditioning apparatus for use with an internal combustion engine having a conventional oil filter through which all the oil pumped through the engine flows before the oil is again pumped and recycled through the engine, said reconditioning apparatus having a housing provided with an oil inlet and an oil outlet, said oil inlet being adapted to be connected to the high pressure side of the engine's oil circulating system so as to deliver a stream of pressurized oil to the apparatus, said housing also having a filter chamber containing a filter medium therein, and a vaporization chamber positioned above the filter chamber and having an inlet side communicating with the filter chamber so as to receive filtered oil therethrough from the filter chamber and to vaporize any liquid contaminants within the filtered oil so as to thereby recondition the oil, said vaporization chamber also having an outlet side through which the reconditioned oil gravitates from the vaporization chamber, the combination therewith of oil flow control means for (a) directing only a minor portion of the stream of pressurized oil from the engine into said oil filter chamber so that the minor portion of the stream of oil may flow therethrough and into said vaporization chamber thereabove, and for (b) concurrently directing the remaining major and manyfold greater portion of the stream of pressurized oil in bypassing relation to said oil filter chamber and said vaporization chamber and out of said oil outlet and back into the engine, and for (c) directing reconditioned oil from the vaporization chamber into the pressurized unreconditioned portion of the stream of oil that has bypassed the oil filter and vaporization chambers so the reconditioned minor portion of the stream of oil will return to the engine under pressure along with the pressurized unreconditioned greater portion of the stream of oil.

3. In an oil reconditioning apparatus for use with an internal combustion engine having a conventional oil filter through which all the oil pumped through the engine flows before the oil is again pumped and recycled through the engine, said reconditioning apparatus having a housing provided with an oil inlet and outlet, said oil inlet being adapted to be connected to the high pressure side of the engine's oil circulating system so as to deliver a stream of pressurized oil to the apparatus, said housing also having a filter chamber containing a filter medium therein and a vaporization chamber positioned above the filter chamber and having an inlet side communicating with the filter chamber so as to receive filtered oil therethrough from the filter chamber and to vaporize any liquid contaminants within the filtered oil to thereby recondition the oil, said vaporization chamber also having an outlet side through which the reconditioned oil gravitates from the vaporization chamber, the combination therewith of means for directing a first portion of the stream of pressurized oil from the engine into said oil filter chamber so that the oil may flow therethrough and into said vaporization chamber thereabove, and aspirator means for directing the remaining portion of the stream of pressurized oil in bypassing relation to said oil filter chamber and said vaporization chamber and out of said oil outlet and back into the engine, and for causing reconditioned oil from the vaporization chamber to be drawn into and joined with the pressurized unreconditioned portion of the stream of oil so that the reconditioned oil is returned to the engine under pressure by and along with the pressurized unreconditioned portion of the stream of oil.

4. An oil reconditioning apparatus according to claim 3 wherein said housing includes a collecting chamber arranged so that reconditioned oil from the lower portion of said vaporization chamber gravitates thereinto, and wherein said aspirator means comprises a restricted nozzle through which the remaining portion of the stream of pressurized oil flows, said nozzle having a discharge end positioned in said collecting chamber and directed toward said housing oil outlet so as to draw reconditioned oil from the collecting chamber into the oil outlet along with the flow of the pressurized unreconditioned oil.

5. An oil reconditioning apparatus according to claim 3 wherein said housing is composed of generally aligned separable sections and said filter chamber constitutes one of said sections and comprises a disposable throwaway filter canister threadedly connected to another of said sections of said housing for ready replacement thereof.

6. An oil reconditioning apparatus for use with an internal combustion engine having a conventional oil filter through which all the oil pumped through the engine flows before the oil is again pumped and recycled through the engine, said reconditioning apparatus comprising a composite housing including a lower section, an intermediate section, an upper section, and a cap for said upper section, said lower section constituting a spin-off filter unit including a canister defining an oil filter chamber containing a filter medium therein, means threadedly securing said canister to a lower portion of said intermediate section, said intermediate section having an oil inlet adapted to be connected to the high pressure side of the engine's oil circulating system so as to deliver a stream of pressurized oil to the apparatus, said housing intermediate section also having an oil outlet adapted to be connected to the low pressure side of the engine's oil circulating system, said housing upper section having a vaporization chamber therein having an inlet side, said intermediate section having passageways therein providing communication between said filter chamber and said inlet side of said vaporization chamber so as to direct filtered oil from said canister into said vaporization chamber, means for heating said vaporization chamber to vaporize any liquid contaminants within the filtered oil passing through the vaporization chamber, said vaporization chamber having an outlet side through which the reconditioned oil gravitates from the vaporization chamber, and oil flow control means in said intermediate section for (a) directing a first portion of the stream of pressurized oil from the oil inlet into said oil filter chamber so that the oil may flow therethrough and into said vaporization chamber thereabove, and for (b) concurrently directing the remaining portion of the stream of pressurized oil in bypassing relation to said oil filter chamber and said vaporization chamber and out of said oil outlet and back into the engine, and for (c) directing reconditioned oil from the vaporization chamber into the pressurized unreconditioned portion of the stream of oil that has bypassed the oil filter and vaporization chambers so the reconditioned oil will return to the engine under pressure along with the pressurized unreconditioned portion of the stream of oil.

7. An oil reconditioning apparatus according to claim 6 wherein said upper section of said housing has an inverted generally frusto-conically shaped cavity therein provided with a stepped surface defining an outer wall of said vaporization chamber and with the larger end of the frusto-conically shaped cavity being open to the upper end of said housing upper section, and wherein said cap closes the upper end of said vaporization chamber and has a downwardly projecting generally frusto-conically shaped and stepped central portion substantially matingly received in said cavity in said housing upper section and defining an inner wall of said vaporization chamber spaced inwardly from said outer wall thereof, and further wherein the stepped outer and inner walls of said vaporization chamber impart an overall stepped configuration to the vaporization chamber.

8. An oil reconditioning apparatus according to claim 7 wherein said cap also has a cavity therein extending from its upper outer end into said frusto-conically shaped portion of said cap, and wherein said means for heating said vaporization chamber comprises an electrical resistance heater removably secured in said cavity in said cap.

9. A method of reconditioning the lubricating oil of an internal combustion engine having a conventional oil filter through which all the oil pumped through the engine flows before the oil is again pumped and recycled through the engine, and utilizing therewith an oil reconditioning apparatus having an oil filter chamber containing a filter medium therein and a heated vaporization chamber above the filter chamber, said method comprising diverting a portion of the oil from the pressure side of the engine into the reconditioning apparatus so as to deliver a pressurized stream of oil to the reconditioning apparatus, filtering solid contaminants from the diverted oil by directing a portion of the pressurized stream of diverted oil into the filter chamber, through the filter medium therein and then upwardly into the vaporization chamber, directing the remaining portion of the pressurized stream of diverted oil in bypassing relation to the filter chamber and the vaporization chamber and then back to the engine, removing liquid contaminants from that portion of the oil stream directed into the vaporization chamber by heating the oil therein and vaporizing the liquid contaminants present in the oil as the oil is flowing, by gravity, through the vaporization chamber, and directing the gravitating reconditioned oil from the vaporization chamber into the pressurized unreconditioned portion of the stream of oil that has bypassed the oil filter and vaporization chambers so the reconditioned oil will return to the engine under pressure along with the pressurized unreconditioned portion of the stream of oil.

10. A method of reconditioning the lubricating oil of an internal combustion engine having a conventional oil filter through which all the oil pumped through the engine flows before the oil is again pumped and recycled through the engine, and utilizing therewith an oil reconditioning apparatus having an oil filter chamber containing a filter medium therein and a heated vaporization chamber above the filter chamber, said method comprising diverting a portion of the oil from the pressure side of the engine into the reconditioning apparatus so as to deliver a pressurized stream of oil to the reconditioning apparatus, filtering solid contaminants from the diverted oil by directing only a minor portion of the pressurized stream of diverted oil into the filter chamber, through the filter medium therein and then upwardly into the vaporization chamber, directing the remaining major and manyfold greater portion of the pressurized stream of diverted oil in bypassing relation to the filter chamber and the vaporization chamber and then back to the engine, removing liquid contaminants from the minor portion of the oil stream directed into the vaporization chamber by heating the oil therein and vaporizing the liquid contaminants present in the oil as the oil is flowing, by gravity, through the vaporization chamber, and directing the gravitating reconditioned oil from the vaporization chamber into the pressurized unreconditioned major portion of the stream of oil that has bypassed the oil filter and vaporization chambers so the reconditioned minor portion of the stream of oil will return to the engine under pressure along with the pressurized unreconditioned manyfold greater portion of the stream of oil.

11. A method of reconditioning the lubricating oil of an internal combustion engine having a conventional oil filter through which all the oil pumped through the engine flows before the oil is again pumped and recycled through the engine, and utilizing therewith an oil reconditioning apparatus having an oil filter chamber containing a filter medium therein and a heated vaporization chamber above the filter chamber, said method comprising diverting a portion of the oil from the pressure side of the engine into the reconditioning apparatus so as to deliver a pressurized stream of oil to the reconditioning apparatus, filtering solid contaminants from the diverted oil by directing a portion of the pressurized stream of diverted oil into the filter chamber, through the filter medium therein and then upwardly into the vaporization chamber, removing liquid contaminants from that portion of the oil stream directed into the vaporization chamber by heating the oil therein and vaporizing the liquid contaminants present in the oil as the oil is flowing, by gravity, through the vaporization chamber, and directing the remaining portion of the pressurized stream of diverted oil in bypassing relation to the filter chamber and the vaporization chamber and then back to the engine, while utilizing the bypassing portion of the stream of oil for creating an aspirating effect at a point of communication with a lower portion of the vaporization chamber so as to cause oil reconditioned in the vaporization chamber to be drawn into and joined with the pressurized unreconditioned portion of the stream of oil so that the reconditioned oil will return to the engine under pressure along with the pressurized unreconditioned portion of the stream of oil.

12. An oil reconditioning apparatus for use with an oil circulating system, comprising a housing provided with an oil inlet and outlet, said oil inlet being adapted to be connected to the high pressure side of an oil circulating system so as to deliver a stream of pressurized oil to the apparatus, said housing also having a filter chamber containing a filter medium therein and a vaporization chamber positioned above the filter chamber and having an inlet side communicating with the filter chamber so as to receive filtered oil therethrough from the filter chamber and to vaporize any liquid contaminants within the filtered oil to thereby recondition the oil, said vaporization chamber also having an outlet side through which the reconditioned oil gravitates from the vaporization chamber, means for directing a first portion of a stream of pressurized oil from an oil circulating system into said oil filter chamber so that the oil may flow therethrough and into said vaporization chamber thereabove, and aspirator means for directing the remaining portion of the stream of pressurized oil in bypassing relation to said oil filter chamber and said vaporization chamber and out of said oil outlet and back into the oil circulating system, and for causing reconditioned oil from the vaporization chamber to be drawn into and joined with the pressurized unreconditioned portion of the stream of oil so that the reconditioned oil is returned to the oil circulating system under pressure by and along with the pressurized unreconditioned portion of the stream of oil.

13. A method of reconditioning oil in an oil circulating system and utilizing an oil reconditioning apparatus having an oil filter chamber containing a filter medium therein and a heated vaporization chamber above the filter chamber, said method comprising diverting a portion of the oil from the pressure side of the oil circulating system into the reconditioning apparatus so as to deliver a pressurized stream of oil to the reconditioning apparatus, filtering solid contaminants from the diverted oil by directing a portion of the pressurized stream of diverted oil into the filter chamber, through the filter medium therein and then upwardly into the vaporization chamber, directing the remaining portion of the pressurized stream of diverted oil in bypassing relation to the filter chamber and the vaporization chamber and then back to the oil circulating system, removing liquid contaminants from that portion of the oil stream directed into the vaporization chamber by heating the oil therein and vaporizing the liquid contaminants present in the oil as the oil is flowing, by gravity, through the vaporization chamber, and directing the gravitating reconditioned oil from the vaporization chamber into the pressurized unreconditioned portion of the stream of oil that has bypassed the oil filter and vaporization chambers so the reconditioned oil will return to the oil circulating system under pressure along with the pressurized unreconditioned portion of the stream of oil.

* * * * *